L. B. JACKSON.
VALVE CONTROLLING APPLIANCE.
APPLICATION FILED SEPT. 24, 1912.

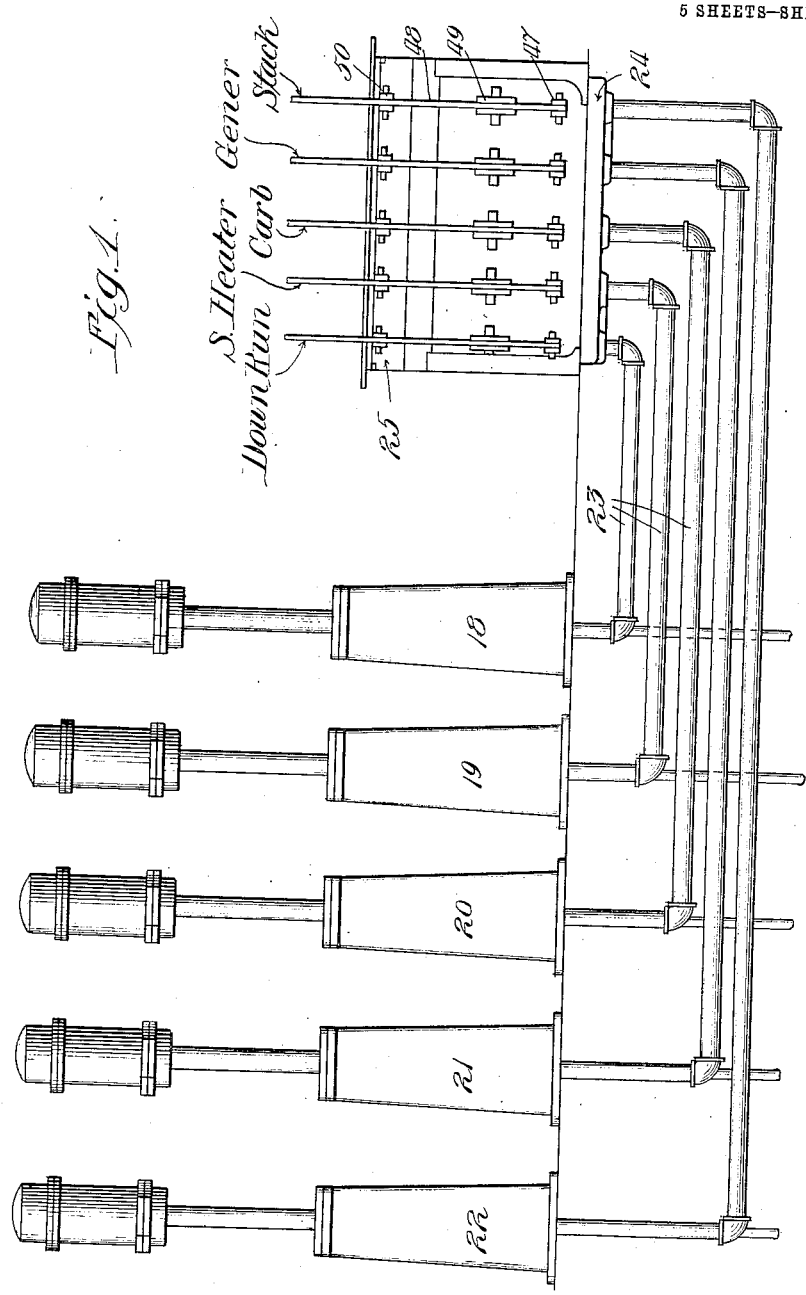

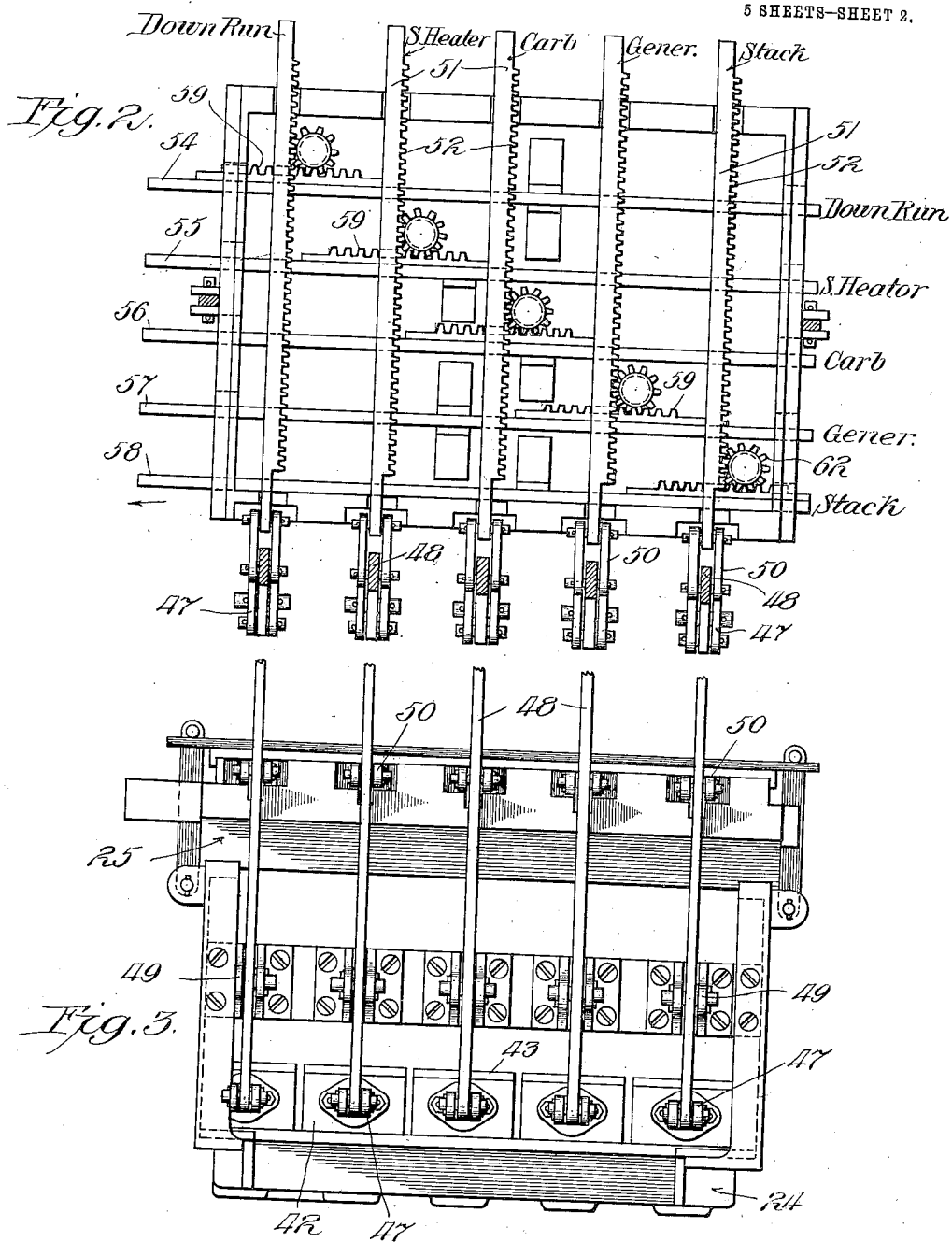

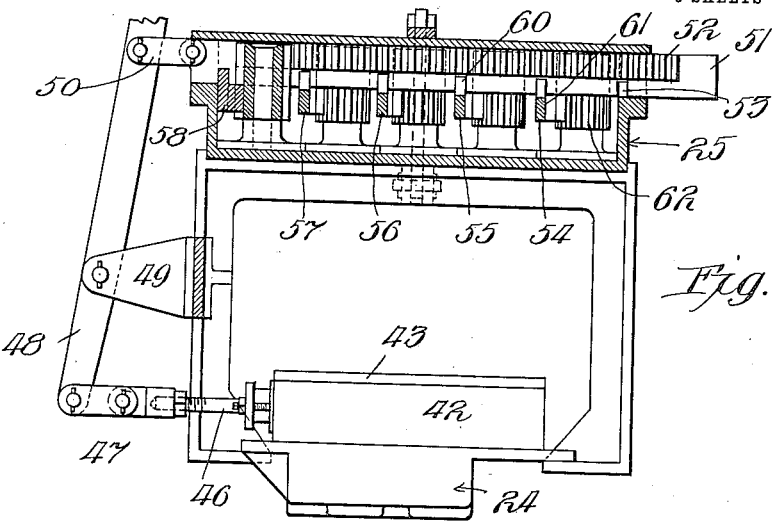
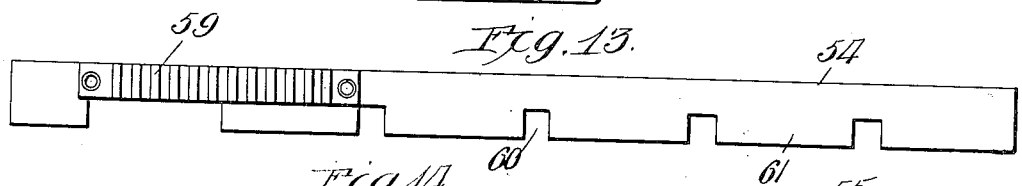
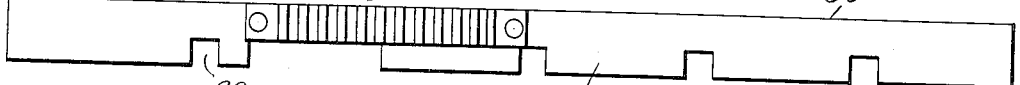
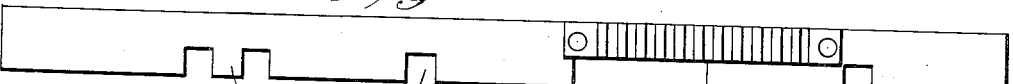
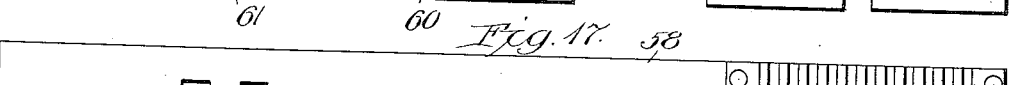

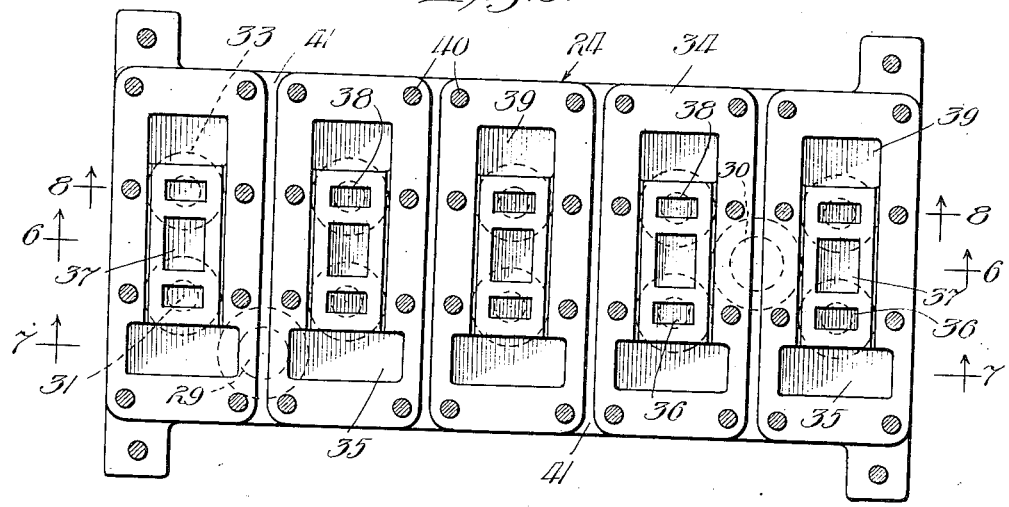
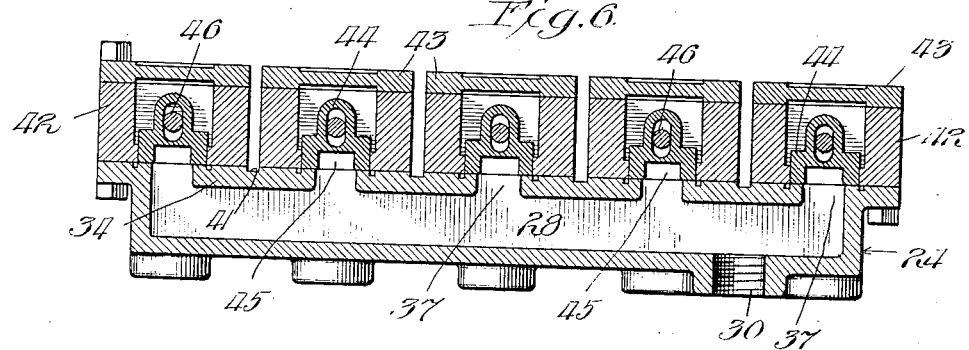
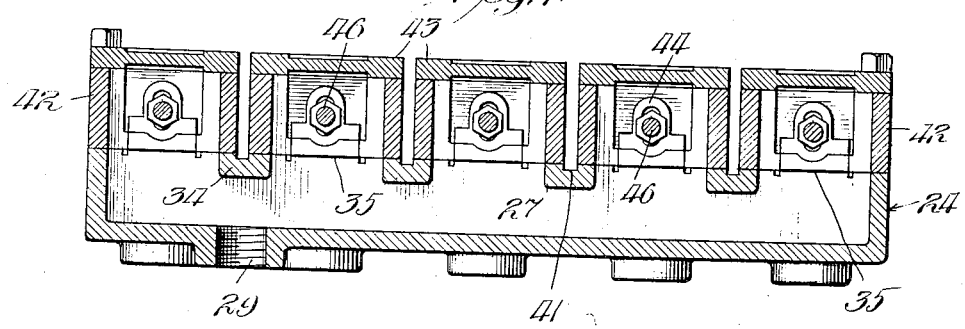

1,053,916.

Patented Feb. 18, 1913.
5 SHEETS—SHEET 5.

Witnesses:
Harry S. Gaither
Wm P Bond

Inventor:
Lawrence B. Jackson
by Banning & Banning
Attys

UNITED STATES PATENT OFFICE.

LAWRENCE B. JACKSON, OF CHICAGO, ILLINOIS.

VALVE-CONTROLLING APPLIANCE.

1,053,916.  Specification of Letters Patent.  Patented Feb. 18, 1913.

Application filed September 24, 1912. Serial No. 722,138.

*To all whom it may concern:*

Be it known that I, LAWRENCE B. JACKSON, a citizen of the United States, residing at Chicago, in the county of Cook and State of Illinois, have invented certain new and useful Improvements in Valve-Controlling Appliances, of which the following is a specification.

The present invention relates more particularly to appliances for controlling and operating a series of valves which it is desired to actuate in a predetermined rotative order, and is especially adapted for use with the series of valves that are associated with gas generators.

The objects of the invention are to centralize the controlling valves for the operating valves and the actuating members for the controlling valves, whereby all of said operating valves can be governed by a single operator stationed at the point of assemblage of the actuating members; and to provide means for governing the movement of the actuating members, so that said controlling and operating valves can only be moved in a predetermined rotative order.

The invention further consists in the features of construction and combination of parts hereinafter described and claimed.

Figure 8:
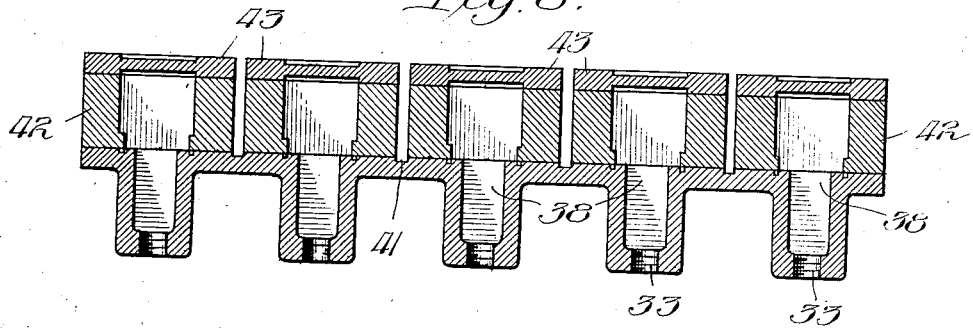
Figure 9:
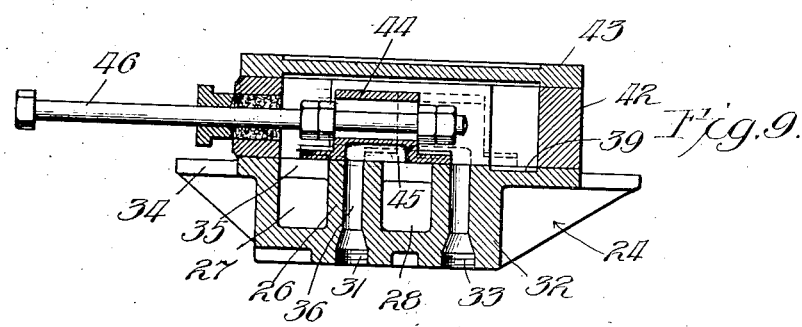
Figure 10:
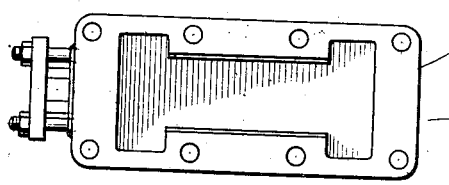
Figure 11:
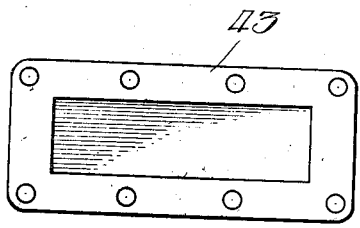

In the drawings, Figure 1 is a diagrammatic view of a series of operating valves with the controlling mechanism of the present invention connected thereto; Fig. 2 is a plan view with the cover removed of the controlling stand of the present invention, showing the interlocking mechanism for governing the movements of the actuating members; Fig. 3 is a front elevation of said stand; Fig. 4 is a vertical section through said stand; Fig. 5 is a plan view of the chambered member in the stand, through which medium under pressure passes to actuate the operating valves; Fig. 6 is a section on line 6—6 of Fig. 5, looking in the direction of the arrow; Fig. 7 is a section on line 7—7 of Fig. 5, looking in the direction of the arrow; Fig. 8 is a section on line 8—8 of Fig. 5, looking in the direction of the arrow; Fig. 9 is a vertical section through the chambered member and valve mechanism therein; Fig. 10 is a plan view of the casing located above said chambered member; Fig. 11 is a plan view of the cap for said casing; Fig. 12 is a side elevation of one of the rack bars connected to the actuating member; and Figs. 13, 14, 15, 16, and 17 are side elevations of the locking bars for governing the movements of the actuating members.

As set forth in the statement of the present invention, this device is particularly designed and adapted for actuating and governing the operating valves used in conjunction with a gas generator. These valves must be operated in a selected rotative order, and the operating of one of the valves at a wrong time frequently results in an explosion which is a menace to the safety of the workmen and a loss to the producer. Moreover, the valves of the gas generator are located some distance apart from one another upon the floor of the generator room, considerable time is therefore spent by the workmen in traveling from valve to valve to operate the same, and it is highly dangerous to entrust the operating of the valves to a number of workmen, since they are apt to lose track of the rotative order in which the valves should be operated, with the result that an explosion follows. In the present invention, a series of actuating members for these operating valves are employed, which are centralized at one point rendering them easy and quickly accessible to a single workman. This expedites the manufacture of the gas, so that the output of the plant is considerably increased, and by providing an interlocking system so as to render the actuating member inoperative, save in a selected rotative order, the danger of pulling the wrong valve and causing an explosion is eliminated, thereby increasing the safety of the workmen and eliminating the expenses incident to the repair of parts after the explosion.

Referring to the drawings, and particularly to Fig. 1, there is illustrated diagrammatically a series of valves used in conjunction with a gas generator, and a series of actuating members for the valves controlling the flow of a medium under pressure or other power to said operating valves. The operating valve 18 may be referred to as the down-run valve; the valve 19 as the superheater valve; the valve 20 as the carbureter valve; the valve 21 as the generator valve; and the valve 22 as the stack valve. Although the above valves are used for the purposes of illustrating the invention, it is understood that the invention is not limited for use with these particular kinds of valves, but may be used with such other valves as may be practical, and also that the appliance of the present invention may be used with a single shell, twin, or three-shell gas machine as desired. Each of the operating valves 18 to 22 inclusive may be of any style and construction, and are for purposes of illustration shown operated by hydraulic power, although the invention is not necessarily limited to this form of operating medium.

Each of the valves is connected by suitable piping or conduits 23 to a chambered lower portion 24 of a controlling stand 25, said chambered lower portion being divided by a partition 26 into an inlet chamber 27 and an exhaust chamber 28, as illustrated in Figs. 7 and 6 respectively, said chambers extending, in the form shown, the entire length of the chambered lower portion 24; and the chamber 27 is provided with a suitable opening 29, through which passes a medium under pressure from a suitable source of supply, and the chamber 28 is provided with a suitable opening 30, through which said medium is exhausted.

Located in the partition wall 26 is a series of ports or passages 31, each of which receives one of the conduits 23 connecting the operating valves with the chambered portion, and an end wall 32 of the portion 24 is provided with a series of ports or passages 33, each of which communicates with one of the conduits 23 leading to the operating valves. It is understood that there are two conduits leading to each valve, one of which conducts pressure above the piston for operating said valve, and the other below. This arrangement is similar to any well known hydraulic valve. Although there is only one chamber 28 and one chamber 27, there is one of the ports or passages 31 and one of the ports or passages 33 for each of the operating valves, and these ports 31 and 33 are located upon opposite sides of the passage 28, as will be seen more clearly in Figs. 5 and 9.

The chambered portion 24 has cast therewith or fixedly secured thereto a top plate 34 having a series of openings therein, said openings being arranged in series extending transversely of the chambered portion, as shown better perhaps in Fig. 5. Said series of openings are each composed of an opening 35 located in alinement with the chamber 27; an opening 36 located in alinement with the passage 31; an opening 37 in alinement with the chamber 28, and an opening 38 located in alinement with the passage 33. The top plate is further provided with a depressed portion 39. There will be provided one series of openings of the form 35 to 38 inclusive for each operating valve; and hence in the construction shown there are five sets or series of openings. The plate 34 is provided with suitable holes 40 to receive locking members hereinafter described. The surface of the plate 34 is divided by depressions 41, so as to make in the construction shown five sections, each of which has embodied therein a series of openings 35 to 38 inclusive. Arranged above each one of these sections is a casing 42, best illustrated in Figs. 6 to 9 inclusive. Each casing is closed at its upper end by a cap plate 43, and through this casing and cap plate is inserted a suitable locking member which enters into the holes 40 and locks the parts into a unitary structure.

Within each of the casings 42 is located a valve 44 which may be termed the controlling valve, and there is one controlling valve provided for each operating valve; hence in the construction illustrated there will be employed five controlling valves. Each controlling valve, as best shown in Fig. 9, is provided with a port or passage 45 which is adapted to place the chambers 27 and 28 in communication with the ports or passages 31 and 33 as desired. As will be seen best from the illustration of Fig. 9, each of the valves slides longitudinally within one of the casings 42 and in the position shown by the full lines in Fig. 9; that is, when the valve is toward the front of the casing, the port 45 in the valve member will be in communication with the port or passage 31 and the discharge chamber 28, so that the medium passing through the conduit 23 which is in communication with the port 31 will be exhausted. The chamber 27 will be in communication with the interior of the casing 42, and the medium from the chamber 27 will pass through said casing and out through the port or passage 33, thus supplying a medium under pressure to the operating valve with which the conduit 23 connected to the port or passage 33 communicates. When the valve is moved into the position shown by the dotted lines in Fig. 9, or toward the rear of the casing, then communication will be established between the chambers 28 and the ports 33 and the chambers 27 and the ports 31, thus reversing the direction of the flow of the medium through the conduit 23; thus when the valve is in the position shown by the full lines in Fig. 9, pressure will be exhausted from one side of the piston of the operating valve being actuated and supplied to the opposite side, and when the valve is moved into the position shown by the dotted lines the action of the pressure upon the faces of the piston of the operating valve will be reversed.

Each controlling valve has secured thereto a stem 46, connected to ears 47, which receives the lower end of an actuating member or lever 48, which is pivoted to suitable ears 49 on the table 25, and which is connected by suitable links 50 at its upper end to a slotted rack bar 51, best shown in Fig. 12. It is understood that there is one rack bar connected to each actuating lever, and as they are all alike only one is shown and described in detail. This rack bar is provided with a rack surface 52 which extends along the upper portion of one side thereof, and the lower face of each of the rack bars is provided with a series of notches 53.

The means which I have illustrated for interlocking the actuating members so as to prevent them from being operated in any other than a predetermined rotative order consists of a series of sliding locking bars 54, 55, 56, 57, and 58. Each of these bars is provided with a rack surface 59 and each with a series of recesses 60. The bar 54 controls the lever for operating the down-run valve; the bar 55 controls the lever for operating the superheater therefor; the bar 56 controls the lever for operating the carbureter valve; the bar 57 controls the lever for operating the generator valve; and the bar 58 operates the lever for controlling the stack valve.

By referring to Fig. 2, it will be seen that the bars 54 to 58 inclusive and the bar 51 are extending at right angles to one another, and that the bars 54 to 58 inclusive must all assume a certain relation to one another in order to provide a passageway across said bars, in which the bar 51 can move. If there is not a recess 60 of each of the locking bars 54 to 58 inclusive in alinement with the bar 51 which it is desired to move, the latter bar cannot be moved, since a portion 61 of one or more of the bars 54 to 58 inclusive would be resting in one of the slots 53 of the bar 51, and thus said bar would be locked against movement. This will be best understood from a study of Fig. 4, in which figure the parts are illustrated as being in a position where slots 60 in the locking bars 55, 56, 57, and 58 are in alinement with the bar 51 therein illustrated, but the bar 54 has a portion 61 resting within the forward slot 53 of the bar 51, and this bar 54 therefore locks and holds the bar 51 against movement.

Referring now to Fig. 2, it will be seen a series of pinions are provided, one for each of the bars 54 to 58 inclusive, which pinions are held against other than rotative movement, and are in mesh with the racks on the bars 51 and on the bars 54 to 58 inclusive. Supposing, for illustration, the actuating lever which is connected to the valve controlling the supply of medium under pressure to the stack valve be operated, the bar 51, marked "Stack" in Fig. 2, will be forced inward, rotating the pinion 62, meshing with the rack on said bar. This in turn would move the bar 58, marked "Stack" in Fig. 2, in the direction of the arrow, thus placing a series of openings 60 in alinement with the next bar to be operated, which for illustration we will say is the one marked "Generator" in Fig. 2; all of the remaining bars 51 would, however, be locked against movement, including the stack bar last mentioned, and the only next possible actuating member which could be moved will be the one which is associated with the controlling valves governing the supply of pressure to the generator valve. When this actuating member is operated, it would move the bar 57, marked "Generator" in Fig. 2, in a manner similar to which the bar 58 was moved, thus placing the bars in position to permit of movement of the next desired actuating member. By this arrangement, the actuating members are at all times held against movement with the exception of the one which it is desired to next operate, thus insuring the operation of said valves in a selected rotative order.

In actual practice, the valves are operated as follows: When the furnace is going on blast, the down run valve is first operated followed by the stack, generator, carbureter, and superheater, in the order mentioned. When the furnace is going on the run, that is, passing the gas off, the superheater valve will first be operated followed by the carbureter, generator, stack, and down-run valve in the order mentioned. This particular arrangement of operation, however, could be varied with whatever sort of work or usage the valves are put to.

Since the operation of each actuating member and each controlling valve in similar, and since the working of the interlocking mechanism is similar each time an actuating member is moved, I will, in briefly describing the operation of my device, only follow through the movement of one actuating member and the interlocking mechanism therefor. Supposing the stack operating valve is to be moved, the actuating lever, marked "Stack" in Fig. 1, is pulled, which actuates the valve 44 associated therewith and the rack bar 51 connected thereto, and through the instrumentalities of the pinion 62 meshing with the rack surface of said bar 51 move the locking bar 55 and aline a series of the slots 60 of the bars 54 to 58 inclusive, so that the rack bar 51 connected to the actuating member to be next moved will have a clear path across the locking bars, all the other bars 51 and the actuating members connected thereto will be locked against movement, so that there is no possibility of the workmen operating any other valve and causing damage. This method of locking and unlocking the actuating members will be continued throughout the operation of the apparatus.

It is, of course, understood that the precise details of construction illustrated can be varied as desired, provided the invention is maintained within the scope of the appended claims.

I claim:

1. In combination, a series of operating valves for a gas generator plant, means for separately and independently actuating each of said valves, an independent controlling member for each of said actuating means, said controlling members being centralized and all operable from a single location and means for preventing the operation of more than one of said controlling members at a time, substantially as described.

2. In combination, a series of operating valves for a gas generator plant, means for separately and independently actuating each of said valves, an independent controlling member for each of said actuating means, said controlling members being centralized and all operable from a single location, an interlocking mechanism for governing the movement of said controlling mechanisms, whereby said members can only be moved in a selected rotative order, substantially as described.

3. In combination, a series of valves for a gas generator plant, means for separately and independently operating each of said valves, an independent controlling means for each of said operating means, said controlling means being centralized and all operable from a single point, an independent actuating member for each controlling means, means for locking said actuating members against movement and means for interlocking the next acting member to be moved by the movement of the actuating member last moved, substantially as described.

4. In a device of the class described, the combination with a series of operating valves, of means for conducting a medium under pressure to said valves, a centralized series of controlling valves for said medium under pressure, one controlling valve for each operating valve, and means for actuating said controlling valves, substantially as described.

5. In a device of the class described, the combination with a series of operating valves, of means for conducting a medium under pressure to said valves, a centralized series of controlling valves for said medium under pressure, one controlling valve for each operating valve, means for actuating said controlling valves, and means for governing said actuating means, whereby only one controlling valve can be operated at a time, substantially as described.

6. In a device of the class described, the combination with a series of operating valves, of means for conducting a medium under pressure to said valves, a centralized series of controlling valves for said medium under pressure, one controlling valve for each operating valve, means for actuating said controlling valves, one actuating means for each controlling valve, means for locking said actuating means against movement, and means for moving one of said locking means to unlocking position by the movement of each actuating means, substantially as described.

7. In a device of the class described, the combination with a series of operating valves, of a controlling stand, a series of controlling valves for said operating valves embodied in said stand, a series of actuating members for said controlling valves secured to said stand, and interlocking mechanism for governing said actuating members, whereby only one of said members can be operated at a time, substantially as described.

8. In a device of the class described, the combination with a series of operating valves, of a controlling stand, a series of controlling valves embodied in said stand, one controlling valve for each operating valve, and means secured to said stand for actuating said controlling valves, substantially as described.

9. In a device of the class described, the combination with a series of operating valves, of a controlling stand, a series of controlling valves for said operating valves embodied in said stand, a series of actuating members for said controlling valves secured to said stand, means for locking said actuating members against movement, and means for releasing the next actuating member to be moved by the movements of the actuating member last moved, substantially as described.

10. In a device of the class described, the combination with a series of operating valves, of a controlling stand provided with a chambered portion divided into an inlet chamber and a discharge chamber for a medium under pressure, a series of conduits leading from said chambers to said operating valves, a series of controlling valves for said conduits, and means for actuating said controlling valves to establish communication through said conduits between said inlet chamber and operating valves and between said discharge chamber and operating valves, substantially as described.

11. In a device of the class described, the combination with a series of operating valves, of a controlling stand provided with a chambered portion divided into an inlet chamber and a discharge chamber for a medium under pressure, a series of conduits leading from said chambers to said operating valves, a series of controlling valves for said conduits, a plurality of actuating members for said controlling valves secured to said stand, and means for locking said actuating members, whereby only one can operate at a time, substantially as described.

12. In a device of the class described, the combination with a series of operating valves, of a controlling stand provided with a chambered portion divided into an inlet chamber and a discharge chamber for a medium under pressure, a series of conduits leading from said chambers to said operating valves, a series of controlling valves for said conduits, a plurality of actuating members for said controlling valve secured to said stand, interlocking means for said actuating members, and means for unlocking the actuating member to be next operated by the movements of the actuating member last operated, substantially as described.

13. In a device of the class described, the combination of a series of operating valves, a controlling stand provided with a chambered portion divided into an inlet chamber and a discharge chamber, a series of conduits leading from said chambers to said operating valves, a series of casings above said chambers and into communication therewith and with said conduits, a controlling valve within each casing, and means for actuating said controlling valves to place selected of said conduits in communication with the inlet chamber and outlet chamber, as desired, substantially as described.

14. In a device of the class described, the combination of a series of operating valves, a controlling stand provided with a chambered portion divided into an inlet chamber and a discharge chamber, a series of conduits leading from said chamber to said operating valves, a series of casings above said chambers and in communication therewith, and with said conduits, a controlling valve within each casing, an actuating member for each controlling valve, and means for locking said actuating member, whereby only one member may be moved at a time, substantially as described.

15. In a device of the class described, the combination of a series of operating valves, a controlling stand provided with a chambered portion divided into an inlet chamber and a discharge chamber, a series of casings above said chambers and in communication therewith, and with said conduits, a controlling valve within each casing, an actuating member for each controlling valve, means for locking said members against movement, and means for unlocking the actuating member to be next operated by the movement of the actuating member last operated, substantially as described.

16. In a device of the class described, the combination of a series of operating valves, a series of centralized controlling valves therefor, a series of actuating members for said controlling valves, a locking bar for each actuating member, and means for moving said bars to unlocked position in selected rotative order, substantially as described.

17. In a device of the class described, the combination of a series of operating valves, a series of centralized controlling valves therefor, a series of actuating members for said controlling valves, a locking bar for each actuating member, and means for moving the locking bar for the actuating member to be next operated by the movement of the actuating member last operated, substantially as described.

18. In a device of the class described, the combination of a series of operating valves, a series of centralized controlling valves therefor, a series of actuating members for said controlling valves, a bar connected to each actuating member, means for locking said bars, and means for moving said locking means to unlocked position in a selected rotative order, substantially as described.

19. In a device of the class described, the combination of a series of operating valves, a series of centralized controlling valves therefor, a series of actuating members for said controlling valves, a bar connected to each actuating member, means for locking said bars, and means actuated by the bar last moved to move the locking means for the bar to be next moved into unlocked position, substantially as described.

20. In a device of the class described, the combination of a series of operating valves, a series of centralized controlling valves therefor, an actuating member for each controlling valve, a bar attached to each actuating member, a locking member for each of said attached bars, and means for moving one of said locking members to unlocked position by the movement of each of the actuating members, substantially as described.

21. In a device of the class described, the combination of a series of operating valves, a series of centralized controlling valves therefor, an actuating member for each controlling valve, a rack bar attached to each actuating member, a locking member for each rack bar, a pinion for each rack bar, and an operative connection between each pinion and a locking member, whereby movement of each actuating member rotates a pinion and moves the locking member for the rack bar to be next actuated into unlocked position, substantially as described.

LAWRENCE B. JACKSON.

Witnesses:
Wm. P. Bond,
Walter Hueltje.